Figure 1:
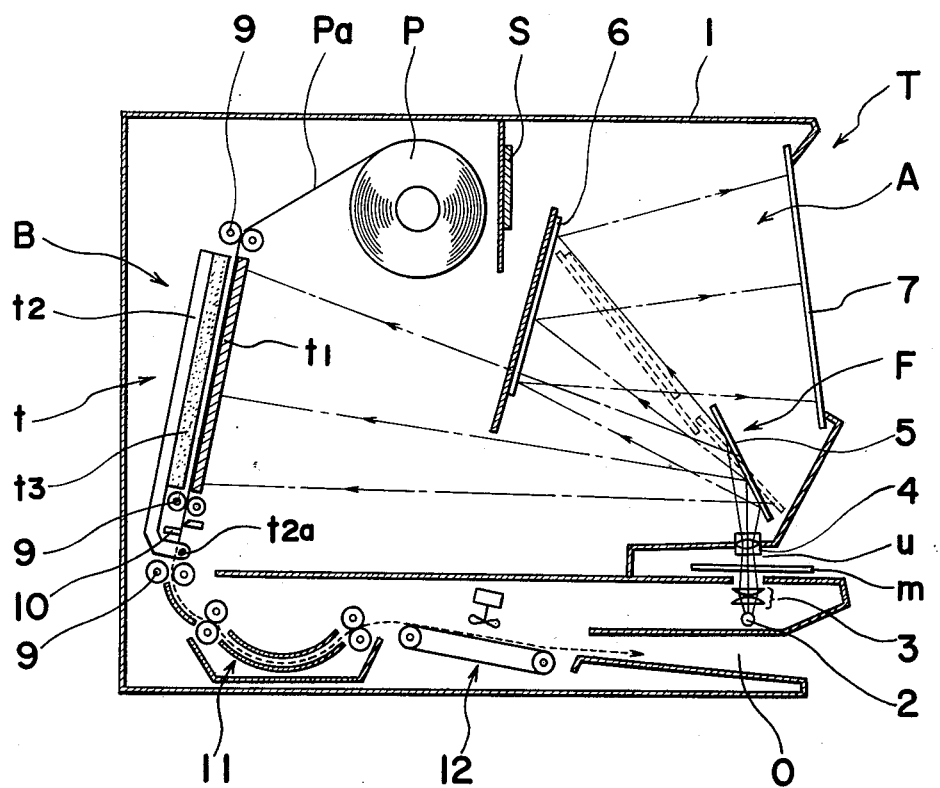

United States Patent [19]

Watanabe

[11] 4,056,318
[45] Nov. 1, 1977

[54] OPTICAL SYSTEM FOR USE IN MICROFILM READING AND PRINTING APPARATUS

[75] Inventor: Yutaka Watanabe, Tokyo, Japan

[73] Assignee: Minolta Camera Kabushiki Kaisha, Osaka, Japan

[21] Appl. No.: 676,887

[22] Filed: Apr. 14, 1976

[30] Foreign Application Priority Data

Apr. 22, 1975 Japan .............................. 50-55644[U]

[51] Int. Cl.$^2$ ....................... G03B 27/32; G03B 21/28
[52] U.S. Cl. ........................................... 355/45; 353/77
[58] Field of Search ....................... 355/10, 18, 27, 45, 355/66, 5; 353/25–27, 74–78, 98, 99

[56] References Cited

U.S. PATENT DOCUMENTS

| 3,183,768 | 5/1965 | Rosenburgh et al. ................. 355/45 |
| 3,264,961 | 8/1966 | Tuttle et al. ....................... 355/27 X |
| 3,713,737 | 1/1973 | Suzuki et al. ........................... 355/45 |
| 3,765,759 | 10/1973 | Yamada ................................. 355/45 |
| 3,907,418 | 9/1975 | Okuyama .............................. 353/77 |

Primary Examiner—Donald A. Griffin
Attorney, Agent, or Firm—Wenderoth, Lind & Ponack

[57] ABSTRACT

An optical system for use in a microfilm reading and printing apparatus which includes two reflecting mirrors for selective projection of light image from a microfilm onto an observation screen and a printing section within the apparatus. The two reflecting mirrors are driven in such a manner that they direct the image light from the microfilm onto the observation screen during reading, while the first reflecting mirror directs the image light from the microfilm toward the printing section during duplication, with the second reflecting mirror being turned away from the light path between the first mirror and the printing section, thus amount of rotation of the reflecting mirrors, especially of the first reflecting mirror being minimized for effective utilization of the limited space within the apparatus housing.

6 Claims, 7 Drawing Figures

OPTICAL SYSTEM FOR USE IN MICROFILM READING AND PRINTING APPARATUS

The present invention relates to a microfilm reading and printing apparatus and more particularly, to an optical system incorporated in a microfilm reading and printing apparatus for selectively directing imagelight of information of a microfilm or microfiche onto an observation screen and a printing section of the microfilm reading and printing apparatus.

Generally, in a microfilm reading and priting apparatus, light image from a microfilm or microfiche illuminated by suitable light source and magnified through a lens assembly of an optical system is selectively projected onto an observation screen and an exposure station for printing, through operation of a relfecting mirror in the optical system for switching the image light from one light path over to another.

There have conventionally been proposed a varieity of optical systems for the above described purpose, most of which optical systems, however employ only one reflecting mirror to be operated for switching-over the light paths, taking into account various factors, such as definition of the projected light image at the image forming portions, cost of the apparatus, simplification of the mechanisms and the like.

The conventional optical system of the above described type, however, has various disadvantages in that, since switching-over of the light paths is effected through operation of one mirror, locations of apparatus components, such as the exposure station for printing, transportation passage of copy paper, and the microfilm etc., are inevitably restricted for securing light paths towards the observation screen and the exposure station, thus being obliged to be moved from optimum positions to other positions of the apparatus for necessity in designing such apparatuses. Moreover, even when such components are favorably arranged within the apparatus somehow, amount of movement, i.e., mainly amount of pivotal movement of the reflecting mirror is unavoidably increased according to the relative positions of the observation screen and the exposure station for printing, thus resulting in increase of the apparatus size to a certain extent and also in time loss arising from the pivotal movement of the reflecting mirror. Furthermore, in the arrangement as described above, the light path itself is also restricted, requiring large space in the apparatus.

One example of such prior art optical systems is disclosed in U.S. Pat. No. 3,765,759 issued Oct. 16, 1973 wherein the second reflecting mirror of the two reflecting mirrors is adapted to pivotally move into or away from the light path for switching the reader printer between the projecting position and the duplicate making position, which optical system also has disadvantages in that, since the amount of the pivotal movement of the second reflecting mirror is considerably large, complicated driving mechanisms therefor are necessary, with an appreciably long period of time being consequently required for positional switching-over of the second reflecting mirror. Should the switching-over of the second reflecting mirror be made in short period of time, increased mechanical impacts will result due to large amount of the pivotal movement of the second reflecting mirror. Furthermore, in the driving mechanisms for the associated movement of the second mirror and the light intercepting plate disclosed in U.S. Pat. No. 3,765,759, since the amount of pivotal movement of the second reflecting mirror and the light intercepting plate is appreciably large, the driving mechanisms therefor are rather complicated, without employment of any associating members therebetween.

Another problem inherent in conventional microfilm reading and printing apparatuses is the undesirable radiation of light transmitting through the observation screen of the apparatus onto the photosensitive copy paper for printing, which light adversely affects the quality of the copy obtained.

Accordingly, an essential object of the present invention is to provide an optical system for use in a microfilm reading and printing apparatus in which a plurality of reflecting mirrors are associated for relative movement for effectively utilizing space in the apparatus, with small amount of displacement of each of the reflecting mirrors through simple mechanism.

Another important object of the present invention is to provide an optical system of the above described type which is further provided with light shielding means for shielding undesirable outside light transmitted through an observation screen.

A further object of the present invention is to provide an optical system of the above described type which is simple in construction and accurate in functioning.

A still further object of the present invention is to provide an optical system of the above described type which is compact in size and can be manufactured at low cost.

According to a preferred embodiment of the present invention, the optical system incorporated in a microfilm reading and printing apparatus includes a first reflecting mirror displaceable, through pivotal movement thereof, between a first position for projecting magnified light image of information of a microfilm illuminated by a light source onto a photoreceptor plate at a printing section and a second position for directing the light image onto a second reflecting mirror, which second reflecting mirror is also displaceable, through pivotal movement, between a first position for reflecting the light image from the first reflecting mirror towards an observation screen of the apparatus and a second position spaced away from a light path from the first reflecting mirror to the photoreceptor plate when the first reflecting mirror is in its first position, and a driving device for driving the reflecting mirrors so that the first reflecting mirror is located in its second position, with the second mirror positioned in its first position during operation of the apparatus as a reader, while the first reflecting mirror is located in its first position, with the second reflecting mirror positioned in its second position during operation of the apparatus as a printer, by which simple arrangement, space within the apparatus is fully utilized with small amount of displacement of the reflecting mirrors.

Figure 2:
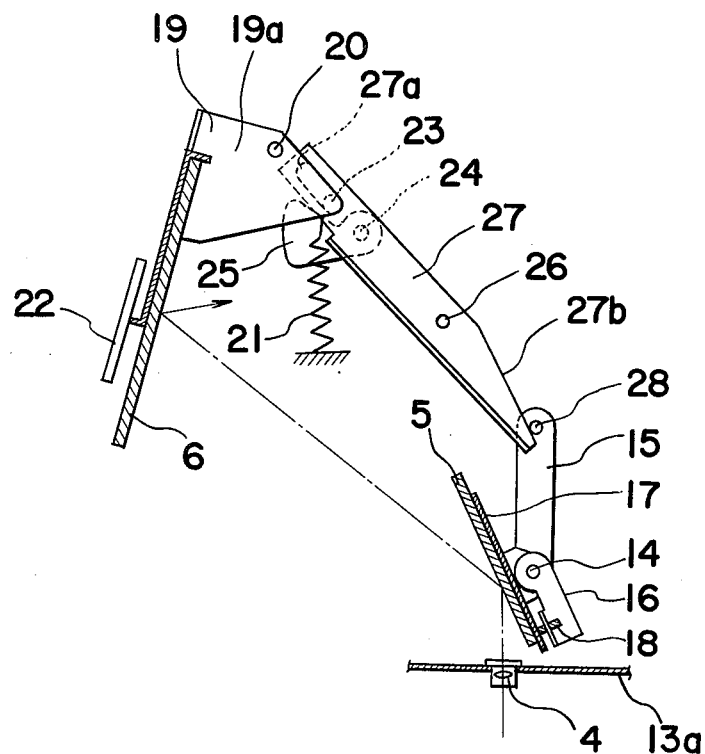
Figure 3:
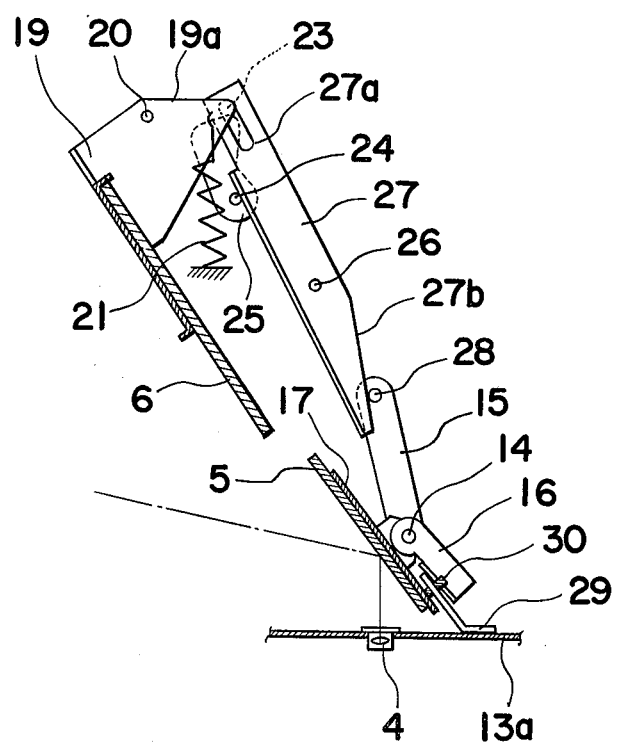
Figure 4:
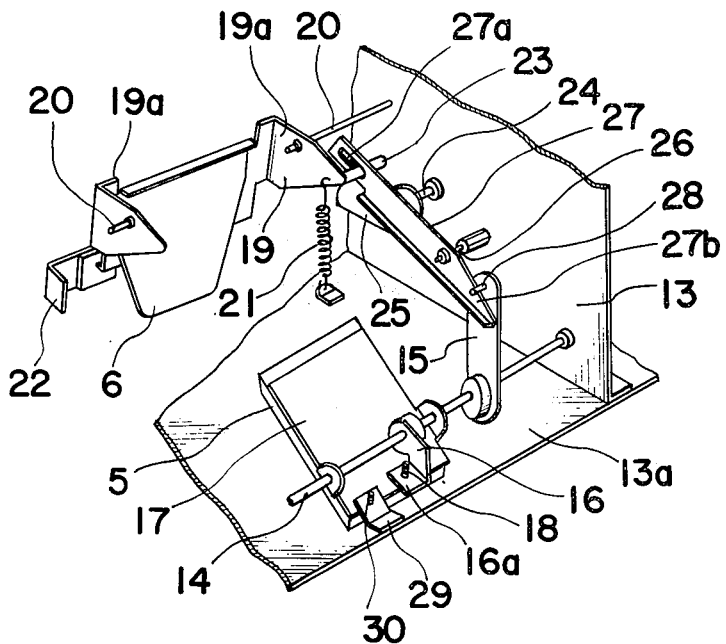
Figure 5:
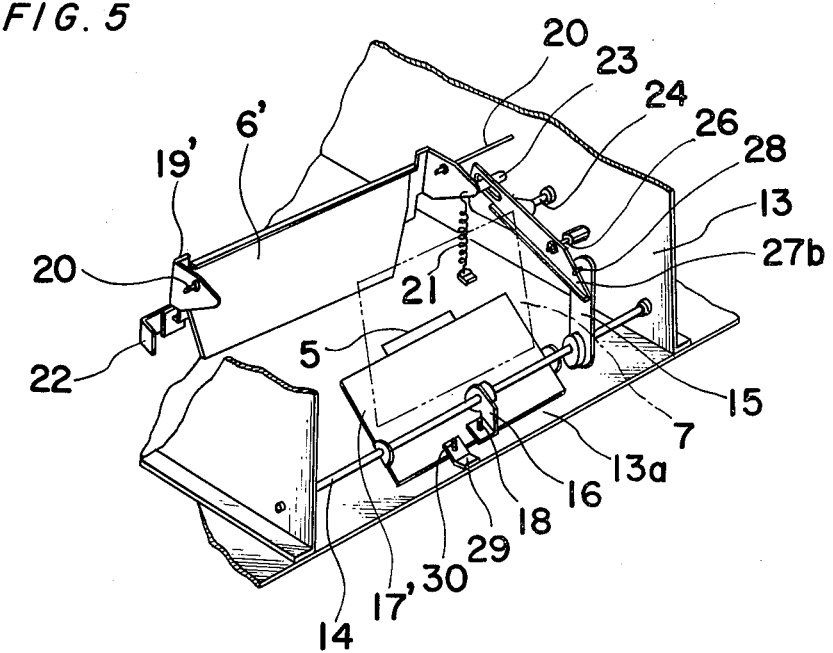
Figure 6:
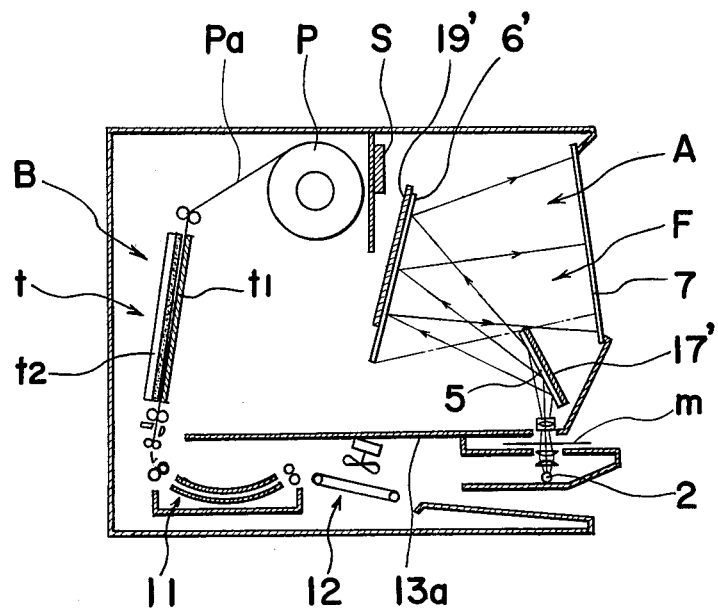
Figure 7:
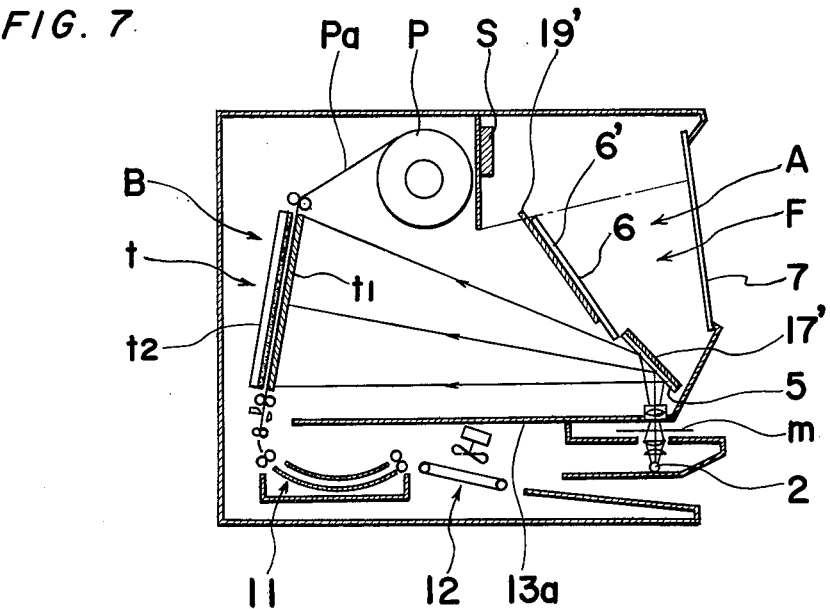

These and other objects and features of the present invention will become apparent from the following description taken in conjunction with the preferred embodiment thereof with reference to the accompanying drawings in which;

FIG. 1 is a schematic sectional view of a microfilm reading and printing apparatus incorporating therein an optical system of the present invention, FIG. 2 is a schematic side view showing, on an enlarged scale, a reflecting mirror driving mechanism employed in the optical system of FIG. 1 with reflecting mirrors positioned for reading position, FIG. 3 is a similar view to FIG. 2, but particularly shows the reflecting mirrors positioned for printing position, FIG. 4 is a perspective view showing arrangement of the reflecting mirror driving mechanism of FIGS. 2 and 3, FIG. 5 is a similar view to FIG. 4, but particularly shows a modification thereof, and FIGS. 6 and 7 are schematic diagrams each explanatory of light shielding effect of the modification of FIG. 5.

Before the description of the present invention proceeds, it is to be noted that like parts are designated by like reference numerals throughout several views of the accompanying drawings.

Referring now to FIG. 1, there is shown a microfilm reading and printing apparatus T incorporating therein an optical system F directly related to the present invention. The apparatus T includes a housing 1 of rectangular box-like configuration defined by side walls, front and rear walls, and top and bottom walls, in which housing 1, there are incorporated a projection section A for projecting, on an enlarged scale, erect light image of information of a microfilm or microfiche m onto an observation screen 7 formed in the front wall of the housing 1 through the optical system F mentioned in detail later, a printing section B provided with an exposure station or exposure position for reproducing, also through the optical system F, the information of the microfilm m on a web of transfer material or copy paper Pa by a transfer device t for duplication when required, which copy paper Pa is fed from a paper roll P rotatably supported at the upper left portion of the housing 1 in a position adjacent to a light shielding plate S extending downwardly from the top wall of the housing 1, and various processing means such as a plurality of feeding rollers 9 for transporting the copy paper Pa, the transfer device t provided in the exposure station at the printing section B for transferring an electrostatic latent image of the information of the microfilm m formed on a photoconductive layer of a photoreceptor plate $t_1$ onto the copy paper Pa, a cutting device 10 for cutting the web of the copy paper Pa into a required length, a wet type developing device 11 for developing the latent image formed on the copy paper Pa into visible image and a drying device 12 for drying and fixing the developed image on the copy paper Pa, which processing means are sequentially disposed in the passage for the copy paper Pa leading to a discharge outlet o formed in the front lowermost portion of the housing 1 in a similar manner to that as in an ordinary electrophotographic copying apparatus. The optical system F includes a light source 2 disposed at the front lower portion of the housing 1 above the discharge outlet o, condenser lenses 3 and a projection lens 4 provided adjacent to and above the light source 2, with the condenser lens 3 and the projection lens 4 whose optical axes are aligned with respect to the light source 2 being spaced from each other through a recess u formed in the front portion of the housing 1 below the screen 7 for permitting insertion of the microfilm m therebetween, and a first reflecting mirror 5 pivotally disposed above the projection lens 4 for selectively directing the light image from the microfilm m toward the photoreceptor plate $t_1$ of the transfer device t in the printing section B or to the observation screen 7 through a second mirror 6 which is also pivotally disposed in the path of light from the first mirror 5. The transfer device t further includes a pressing electrode plate $t_2$ for selectively pressing the copy paper Pa fed onto the photoreceptor plate $t_1$ against the photoreceptor surface of said plate $t_1$ and releasing the same therefrom, which electrode plate $t_2$ is pivotally connected at one edge $t_{2a}$ thereof to a frame (not shown) of the housing 1 in a position below the photoreceptor plate $t_1$ and further has a conductive elastic pad $t_3$ applied on its surface facing the corresponding surface of the photoreceptor plate $t_1$, with the pressing electrode plate $t_2$ being adapted, through a suitable driving means (not shown) to rotate about the pivotal point $t_{2a}$ for pressing the copy paper Pa fed between the photoreceptor plate $t_1$ and the electrode plate $t_2$ against said plate $t_1$ through the conductive elastic pad $t_3$ while a predetermined voltage is impressed between a photoconductive layer of the photoreceptor plate $t_1$ and the electrode plate $t_2$ for efficient transfer operation. Construction and function of the transfer device t are fully described in the co-pending U.S. patent application Ser. No. 615,708 entitled Electrophotographic Copying Apparatus and filed on Sept. 22, 1975, now U.S. Pat. No. 4,021,108 so that reference should be made thereto for details thereof.

It should be noted here that the first and second reflecting mirrors 5 and 6 for optical system F are located in positions as shown in FIG. 1 by real lines during projection of the light image from the microfilm m onto the observation screen 7, while the same mirrors 5 and 6 are positioned as shown by dotted lines during exposure of the photoreceptor plate $t_1$ to the light image from the microfilm m.

Referring now to FIGS. 2 to 4, there are shown driving mechanisms for the reflecting mirrors 5 and 6, in which, levers 15 and 16 are secured, each at one end and in spaced relation to each other, on a shaft 14 rotatably supported by frame 13 for simultaneous rotation with the latter, while a pedestal or base plate 17 for the first reflection mirror 5 is also mounted through openings formed in a pair of projections formed on opposite side edges thereof, on the shaft 14 in such a manner that the same plate 17 is rotatable in one direction (counterclockwise in FIGS. 2 and 3) by its weight. The lever 16 has its other end 16a bent in a direction parallel to the axis of the shaft 14 to form a stopper for limiting rotation of the mirror 5 thereat, which end 16a is provided with a fine adjusting screw 18 screwed thereinto and contacting the base plate 17 for regulating the rotation of the first reflection mirror 5. On the other hand, the second reflecting mirror 6 is fixedly mounted on a pedestal or base plate 19 which is rotatably supported, through openings formed in its opposite side paltes 19a, by a shaft 20 secured to side frames 13 of the housing 1, with a spring 21 being connected between one of the side plates 19a and a horizontal frame 13a of the housing 1 for urging the base plate 19 and consequently the mirror 6 to turn in one direction (clockwise in FIGS. 2 and 3), while the rotation of the mirror 6 is restricted by contact of the base plate 19 with a stopper plate 22 fixedly disposed on a frame (not shown) behind the plate 19. A pin 23 fixedly mounted at its one end to the extreme end of the side plate 19a to which the end of the spring 21 is connected extends outwardly in a direction parallel to the shaft 20 through an elongated opening 27a formed in a corresponding end of a lever 27 which is rotatably supported at its other end by a shaft 26 secured to the frame 13, with the free end of the pin 23 contacting a cam surface of a cam plate 25 which is fixedly mounted to an extreme end of a driving shaft 24 extending through the frame 13 of the housing 1 and coupled to a suitable driving source (not shown). It should be noted here that the elongated opening 27a may be replaced by any other suitable guide means such as a notch formed at corresponding edge of the lever 27 and the like. The end of the lever 27 further extending from the portion thereof supported by the shaft 26 is cut at an angle to form a tapered portion 27b at its upper edge which engages a pin 28 secured to the lever 15 as most clearly seen in FIG. 4. On the surface of the horizontal frame 13a of the housing 1 in a position adjacent to the lever 16, a stopper plate 29 is secured at its one end, with the other end of the plate 29 which extends above the base plate 17 of the first reflecting mirror 5 being provided with a fine adjusting screw 30 for adjusting direction of light reflected by the mirror 5 during projection of the image light from the microfilm m toward the printing section B.

By the above arrangement, when the image light of the information from the microfilm m is to be projected onto the observation screen 7, the movements of the first and second reflecting mirrors 5 and 6 are restricted by the screw 18 of the lever 16 and the stopper 22 respectively, with the rotation of the driving shaft 24 being suspended, for directing the light image onto the screen 7 through the reflecting mirrors 5 and 6 as shown in FIG. 2, in which case, position of the light image projected on the screen 7 can be adjusted by varying the angle of the first reflecting mirror 5 and second reflecting mirror 6 through adjustment of the screw 18 of the lever 16 and stopper 22.

Upon depression of a print button (not shown), the light source 2 goes out, and simultaneously, the driving shaft 24 and consequently the cam plate 25 start rotation (clockwise in FIGS. 2 and 3), with the cam plate 25 in contact with the pin 23 pushing up said pin 23, which in turn rotates the base plate 19 of the second reflecting mirror 6 counterclockwise about the pin 20 against the urging force of the spring 21 for causing the mirror 6 to move out of the light path toward the printing section B.

On the other hand, since the pin 23 engages the elongated opening 27a of the lever 27, the former slides along the latter when the pin 23 is raised by the cam 25, with the lever 27 rotating clockwise about the shaft 26. Furthermore, since the lever 16 secured on the shaft 14 and contacting the base plate 17 for the first reflecting mirror 5 through the adjusting screw 18 is urged counterclockwise by the weight of the mirror 5 so that the pin 28 of the lever 15 secured to the shaft 14 always contacts the tapered edge 27b of the lever 27, the levers 15 and 16 also rotate counterclockwise simultaneously with the rotation of the shaft 14, in which case, although the first reflecting mirror 5 rotates as one unit with the base plate 17 about the shaft 14, the base plate 17 contacts the adjusting screw 30 of the fixed stopper plate 29 before the pin 23 reaches the highest point within the opening 27a, and the mirror 5 stops with the base plate 17 thereof being spaced away from the adjusting screw 18 of the lever 16. The angle of the mirror 5 is further adjusted by the adjusting scew 30 of the fixed stopper plate 29 to form the light image of the information from the microfilm m exactly on the surface of the photoreceptor $t_1$ at the printing section B. When the second reflecting mirror 6 is completely brought out of the light path between the mirror 5 and the photoreceptor $t_1$ as the cam plate 25 further rotates (the state shown in FIG. 3), the light source 2 is lit for projecting the information of the microfilm m onto the photoreceptor plate $t_1$ for the formation of the latent image of the information on the copy paper Pa, with the copy paper Pa being pressed, through the conductive elastic pad $t_3$, against the photoreceptor plate $t_1$ by the pressing electrode plate $t_2$ during impression of an electrical potential across the plates $t_1$ and $t_2$. The light source 2 goes out after the latent image of the information has been formed on the copy paper Pa, at which time, the pressing electrode plate $t_2$ releases the copy paper Pa from the photoreceptor plate $t_1$ for allowing the copy paper Pa to be fed into subsequent processing means. The cam plate 25 is so formed in its configuration as to keep the second reflecting mirror 6 turned away from the light path between the first reflecting mirror 5 and the photoreceptor plate $t_1$ for a predetermined period of time during the above described exposure of the photoreceptor plate $t_1$ as shown in FIG. 3. It should be noted here that the transfer device t having the photoreceptor plate $t_1$ and pressing electrode plate $t_2$ described as employed in the apparatus T of FIG. 1 may be dispensed with for direct formation of the latent image onto a photosensitive copy paper fed into the printing section B in the similar manner, depending on the necessity. Subsequently, as the cam plate 25 further rotates clockwise, the pin 23 of the base plate 19 for the mirror 6 contacting the cam plate 25 gradually descends along the cam surface of the same cam plate 25, with consequent clockwise rotation of the base plate 19 and the mirror 6 about the shaft 20 by the urging force of the spring 21, while the lever 27 whose elongated opening 27a is in sliding contact with the pin 23 of the base plate 19 also rotates countercloskwise about the shaft 26. When the cam plate 25 has made one rotation, the pin 23 of the base plate 19 leaves the cam surface of the cam plate 25, with the base plate 19 which is urged clockwise by the spring 21 again contacting the stopper plate 22 to return to the original position accurately. On the other hand, the pin 28 of the lever 15 contacting the tapered edge 27b of the lever 27 is pushed to move, following counterclockwise rotation of the lever 27 about the shaft 26, so as to turn clockwise the lever 15, and consequently the shaft 14 and the lever 16 which are of integral connection with each other, whereby the adjusting screw 18 of the lever 16 is again brought into contact with the base plate 17 of the first reflecting mirror 5 to rotate the mirrot 5 clockwise, and when the cam plate 25 stops rotation at the position shown in FIG. 2, the mirror 5 also stops accurately at the original position.

As is clear from the foregoing description, according to the optical system of the invention, since the two reflecting mirrors are driven by the driving device in such a manner that the first reflecting mirror 5 directs the image light from the microfilm away from the second reflecting mirror 6 toward the photoreceptor plate $t_1$ or exposure position in the printing section B during duplication, with the second reflecting mirror 6 being tuned away from the light path between the mirror 5 and the photoreceptor plate $t_1$, the amount of rotation of the reflecting mirrors 5 and 6, especially of the mirror 5 is minimized, thus making it possible to effectively utilize the limited space within the apparatus housing. Furthermore, despite the fact that two reflecting mirrors are employed, these reflecting mirrors are driven for associated movement through very simple mechanism incorporated in the apparatus, with consequent reduction of the apparatus size and manufacturing cost.

Referring now to FIGS. 5 to 7, there is shown in FIG. 5 a modification of the optical system F of FIGS. 1 to 4. In this modification, width of the base plate 17 for the first reflecting mirror 5 and that of the second reflecting mirror 6 and the base plate 19 therefor are further extended to the width of the observation screen 7 for improving shielding effect against outside light transmitting through the observation screen 7 onto the photoreceptor plate $t_1$. In the projecting position of FIG. 6 wherein the light image of the information of the microfilm m is directed toward the observation screen 7 through the reflecting mirrors 5 and 6 as shown by arrows, the outside light transmitting through the observation window 7 into the apparatus housing 1 is almost completely shielded as shown by a chain line by the presence of the shielding plate S, the base plate 17' of the fisrt reflecting mirror 5, and the base plate 19' and other members for the second reflecting mirror 6' without reaching the photoreceptor plate $t_1$, with any amount of outside light incident upon the frame 13a being reflected thereby for radiation. Additionally, such outside light is attenuated depending on the transmittance of the observation screen 7, the reflectance of the frame 13 and the like to such an extent as to be negligible as compared with the normal reflecting light from the light source 2, thus there being substantially no adverse effect on the quality of the duplicate available. In the printing position of FIG. 7 wherein the light image of the information of the microfilm m is directed toward the photoreceptor palte $t_1$ through the reflecting mirrors 5 and 6' as shown by arrows, the outside light transmitting through the observation screen 7 is also almost perfectly intercepted as shown by a chain line by the base plate 17' for the first reflecting mirror 5, the base plate 19' and other members for the second reflecting mirror 6', and the shielding plate S.

As is seen from the above description, in the modification of FIGS. 5 to 7, extremely perfect light shielding effect is further achieved through mere extension of the width of the base plate of the first reflecting mirror and that of the base plate and the second reflecting mirror to the width of the observation screen, which arrangement contributes much to efficient operation of the microfilm reading and printing apparatus.

It should be noted here that, although the optical system of the invention is mainly described with reference to a microfilm reading and printing apparatus, the concept of the invention is not limited to a microfilm reading and printing apparatus, but may be applied to any other apparatus in which selective projection of light image onto a plurality of predetermined positions is required.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. An optical system for use in a microfilm reading and printing apparatus which comprises a lens assembly for selectively projecting, on an enlarged scale, image light of information on a microfilm illuminated by a light source onto an exposure station of a printing section and onto an observation screen of the microfilm reading and printing apparatus, a first reflecting mirror, a second reflecting mirror, said first reflecting mirror being displaceable between a first position thereof for projecting said image light through said lens assembly onto said exposure station and a second position thereof for projecting said image light onto said second reflecting mirror, said second reflecting mirror being displaceable between a first position thereof for projecting said image light from said first mirror at said second position onto said observation screen and a second position thereof spaced away from a path of said image light between said first reflecting mirror at said first position and said exposure station, said first and second reflecting mirrors being disposed for intercepting outside light entering from said observation screen when the former is at said first position and the latter is at said second position, and driving means for positioning said first reflecting mirror to said second position and said second reflecting mirror to said first position during reading, and also for positioning said first reflecting mirror to said first position and said second reflecting mirror to said second position during printing.

2. An optical system as claimed in claim 1, wherein said driving means includes members for associating said first reflecting mirror with said second reflecting mirror, with said first and second reflecting mirrors being driven for associated movements therebetween by a common driving source.

3. An optical system as claimed in claim 2, wherein said associating members further include a first and second levers which are each secured, at its one end, on a first shaft rotatably supported by a frame of a housing of said apparatus, with a first base plate for said first reflecting mirror being rotatably supported on said first shaft in a direction parallel to the latter for enabling said first reflecting mirror to rotate in one direction until said first base plate contacts the other end of said second lever forming a first stopper, a third lever pivotally supported, at a position adjacent to one end thereof in a direction normal to said first lever by a second shaft which is secured to the frame and extends in a direction parallel to said first shaft, said third lever having, at said one end, a tapered edge engaging a first pin member secured to the other end of said first lever, with guide means being formed at the other end of said third lever, a cam plate secured to an end of a driving shaft which extends in a direction parallel to said second shaft through said frame up to a position adjacent to said guide means of said third lever and which is connected to said common driving source, a third shaft secured to the frame and extending in a direction parallel to said first shaft, with a second base plate for said second reflecting mirror which is rotatably supported by said third shaft being urged, to rotate in a direction counter to the direction of the rotation of said first reflecting mirror until said second base plate of said second reflecting mirror contacts a third stopper member fixedly disposed therebehind, and a second pin member secured at one end thereof to one side of said second base plate adjacent to corresponding end of said third lever and contacting cam surface of said cam plate through said guide means.

4. An optical system as claimed in claim 3, wherein said guide means is an elongated opening formed at said the other end of said third lever.

5. An optical system as claimed in claim 3, wherein said second lever is further provided, at said the other end thereof contacting said first base plate of said first reflecting mirror, with a first adjusting screw for adjusting angle of said first reflecting mirror to bring the light image projected onto the observation screen to a correct position, with a second stopper plate being secured at one end thereof to the frame at a position adjacent to said second lever, the other end of said second stopper plate which extends over said first base plate being provided with a second adjusting screw for adjusting angle of said first reflecting mirror to direct the image light reflected by said first reflecting mirror exactly onto the exposure station during projection of the image light toward the exposure station.

6. An optical system for use in a microfilm reading and printing apparatus which comprises a lens assembly for selectively projecting, on an enlarged scale, image light of information on a microfilm illuminated by a light source onto an exposure station of a printing section and onto an observation screen of the microfilm reading and printing apparatus, a first reflecting member, a second reflecting member, said first reflecting member being displaceable between a first position thereof for projecting said image light through the lens assembly onto said exposure station and a second position thereof for projecting said image light on said second reflecting member, said first reflecting member normally being disposed at said first position by its weight, said second reflecting member being displaceable between a first position thereof for projecting said image light from said first reflecting member at said second position onto said observation screen and a second position thereof spaced away from a path of said image light between said first reflecting member at said first position and said exposure station, and driving means for driving said first and second reflecting member and including first and second lever members provided on said first and second reflecting members respectively, an associating member engaged with said first and second lever members, an urging member connected with said second lever member and urging said second reflecting member to said first position and urging said first lever member through said associating member to maintain said first reflecting member at said second position during reading, a driving source for driving said second lever member against said urging member to bring said second reflecting member to said second position with said associating member following the movement of said second lever member to move said first lever member by the weight of said first reflecting member to bring said first reflecting member to said first position, whereby said first and second reflecting members are positioned suitable for printing.

* * * * *